United States Patent [19]
Heinzlreiter

[11] Patent Number: 6,132,845
[45] Date of Patent: Oct. 17, 2000

[54] APPARATUS AND METHOD FOR FORMING MICRO SPIKE LINERS AND A MICRO SPIKE LINER FORMED THEREBY

[75] Inventor: Heinrich Heinzlreiter, Penz, Austria

[73] Assignee: AGRU Kunststofftechnik GmbH, Bad Hall, Austria

[21] Appl. No.: 08/918,205

[22] Filed: Aug. 25, 1997

[51] Int. Cl.$^7$ ...................................... B32B 3/00
[52] U.S. Cl. ........................... 428/156; 428/141; 428/120
[58] Field of Search .................................... 428/156, 172, 428/119, 120, 141

[56] References Cited

U.S. PATENT DOCUMENTS

| | | | |
|---|---|---|---|
| 3,895,153 | 7/1975 | Johnston et al. | 428/141 |
| 4,183,978 | 1/1980 | Hefele | 428/212 |
| 4,488,918 | 12/1984 | Jofs | 428/172 |
| 4,612,152 | 9/1986 | Kawabata et al. | |
| 4,885,201 | 12/1989 | Brandt . | |
| 5,075,135 | 12/1991 | Brandt . | |
| 5,258,217 | 11/1993 | Lewis | 428/120 |

OTHER PUBLICATIONS

Figs. 1–4 of U.S. Design Patent Application Serial No. 29/048,977.

Primary Examiner—Donald Loney
Attorney, Agent, or Firm—Anthony J. Casella; Gerald E. Hespos

[57] ABSTRACT

An apparatus and methods for forming micro spike thermoplastic liners and micro spike thermoplastic liners formed thereby are provided. A textured thermoplastic liner having at least one roughened surface with a plurality of irregularly shaped projections extending therefrom is disclosed. The thermoplastic liner of the subject invention is formed by using a calendering roll having a generally cylindrically shaped body with a non-smooth outer surface and a plurality of blind apertures, each having an irregularly shaped opening formed coextensively with the non-smooth surface. The liner is formed by having the non-smooth surface of the calendering roll impress a roughened pattern onto the liner and simultaneously form the plurality of irregularly shaped projections. The calendering roll is formed by initially drilling a plurality of blind apertures and, subsequently, roughening the outer surface of the roll such that the openings of each of the apertures are each caused to be irregularly shaped.

2 Claims, 4 Drawing Sheets

APPARATUS AND METHOD FOR FORMING MICRO SPIKE LINERS AND A MICRO SPIKE LINER FORMED THEREBY

BACKGROUND OF THE INVENTION

1. Field of the Invention

The inventions disclosed herein relate to apparatus and methods for forming thermoplastic liners and thermoplastic liners formed thereby, more particularly, apparatus and methods for forming micro spike thermoplastic liners and micro spike thermoplastic liners formed thereby.

2. Description of the Prior Art

Thermoplastic liners have been used extensively in the prior art to seal tunnels, excavation sites, landfills, and the like. Typically, to cover the desired area with the thermoplastic liner, continuous lengths of the liner are placed in either partial overlapping or abutting contact and caused to be connected in some leak-proof method, such as welding. It can be readily appreciated that some concerns arise with the use of thermoplastic liners. First, since thermoplastic liners must be used at various grades, the liners must be provided with at least one surface which can frictionally engage the graded surface and maintain the liner in a desired location. Second, due to the tremendous area often required to be covered by a thermoplastic liner, the costs of manufacturing such liners needs to be minimized.

Several approaches have been taken in the prior art to produce an acceptable thermoplastic liner. For example, a repeated embossed pattern is provided on one surface of the thermoplastic liner, such as shown in U.S. Pat. No. 4,612,152 to Kawabata, et al. Prior art embossing techniques, however, suffer from several drawbacks. First, the underlying base substrate of the thermoplastic liner must be substantially deformed to achieve a desired embossed pattern, which may result in damage to the base substrate. Second, typically, the repetition of an embossed pattern creates regular, continuous grooves in the thermoplastic liner between the embossed projections. Over time, the continuous grooves may cause the underlying engaged material, such as soil, to furrow therein, with further furrowing allowing movement of the liner relative to the underlying material and eroding the gripping force thereof. Third, although the process of embossing thermoplastic seeks to define sharp edges in the embossed substrate, the edges are often formed rounded with a small radius. This effect, of course, reduces the grip of the film on underlying material.

To overcome the shortcomings of the prior art, it is an object of this invention to provide a roughened thermoplastic liner formed with a plurality of even-spaced projections, which are each irregularly formed.

It is also an object of the subject invention to provide a calendering roll for forming a roughened thermoplastic liner having a plurality of evenly-spaced projections, which are each irregularly formed.

It is yet another object of the subject invention to provide a method for forming a thermoplastic liner having a roughened surface with a plurality of evenly-spaced projections, with each projection being irregularly formed.

It is still a further object of the subject invention to provide a method for forming a calendering roll which is for forming a thermoplastic liner having a roughened surface with a plurality of evenly-spaced projections, with each projection being irregularly formed.

SUMMARY OF THE INVENTION

The above-stated objects are met by a thermoplastic liner of indeterminate dimensions, which has two opposing surfaces, with at least one of the surfaces being roughened and having a plurality of projections extending therefrom. The liner of the subject invention is formed by a calendering process.

The thermoplastic liner is formed with a base layer having two opposed outer surfaces. The outer surfaces are substantially parallel and are coextensive with the overall length and width dimensions of the liner. At least one of the outer surfaces is roughened with a repeated irregular pattern. The projections are each irregularly shaped and extend from the roughened surface. Preferably, the projections are evenly-spaced both laterally and longitudinally on the roughened surface, but, alternatively, the projections can be offset in lateral and/or longitudinal directions or be randomly located. Each projection is irregularly formed, due to the process of forming the subject liner described below. The combination of the projections and the roughened surface allows the liner of the subject invention to frictionally engage a desired location. The roughened surface and irregular shapes of the projections prevent the underlying engaged material from furrowing, thereby ensuring good frictional engagement between the liner and the underlying material. The term "irregular", or any derivative thereof as used herein, is intended to describe a shape which is not an evenly-formed geometric shape such as a circle, oval, rectangle, parallelepiped, etc.

The liner of the subject invention is formed by a calendering process which utilizes a new and improved calendering roll. The calendering roll of the subject invention is generally cylindrically-shaped with an outer surface which is roughened. Blind apertures extend into the roll from the outer surface. Each blind aperture is formed with an irregularly shaped opening, which is coextensive with the outer surface of the roll, and a constant circular cross-section portion extending therefrom into the roll of the subject invention.

The calendering roll of the subject invention is formed by drilling a plurality of blind apertures into a generally cylindrically-shaped roll. The apertures are each drilled to define a constant cross-section. Preferably, the drilled apertures are evenly spaced circumferentially and axially about the body of the roll. Subsequently, the outer surface of the roll is made roughened with an irregular pattern by any method known by those skilled in the art. For example, knurling can be used. The outer surface must also be roughened about the openings of each of the apertures such that the openings each become irregularly formed.

The above-described calendering roll is used in a method for forming the above-described thermoplastic liner. To form the thermoplastic liner, molten thermoplastic is continuously extruded through a slot die to form a thermoplastic sheet having opposed substantially smooth outer surfaces. The above-described calendering roll is provided in a parallel spaced relationship from a second roll to define a nip therebetween. The extruded thermoplastic sheet is fed into the nip with the thermoplastic being urged, under pressure generated in the nip, into various apertures of the calendering roll and into pressing engagement with the roughened outer surface of the calendering roll, as the sheet passes through the nip. The sheet is then disengaged from the roll with the pattern of the roughened surface formed on the calendering roll being impressed thereon. Also, the projections are each damaged and elongated upon removal from the respective apertures, due to the irregularly shaped openings through which the respective projections must pass, and the irregular forming of the projections is achieved.

The calendering roll can be heated or chilled. Heating or cooling the thermoplastic liner during the calendering process affects the elongation and extent of damage of the respective projections, accordingly. It should be noted that heating or cooling the calendering roll is not required. Preferably, the temperature of the calendering roll should be maintained such that, prior to removal of the projections from the apertures of the calendering roll, the outer surface of the respective projections hardens, and the cores of the respective projections are in a molten state. As such, upon removal of the projections from the respective apertures, the irregularly shaped openings cause the hardened outer surfaces of the projections to be damaged by the irregular edges of the apertures and, simultaneously, cause the molten cores to be elongated. Heating or cooling the calendering roll will cause the projections to harden to varying degrees, resulting in varying degrees of damage to the projections and varying degrees of elongation.

These and other features of the invention are better understood through a study of the following detailed description of the invention and the accompanying drawings.

DETAILED DESCRIPTION OF THE PREFERRED EMBODIMENTS

Figure 1:
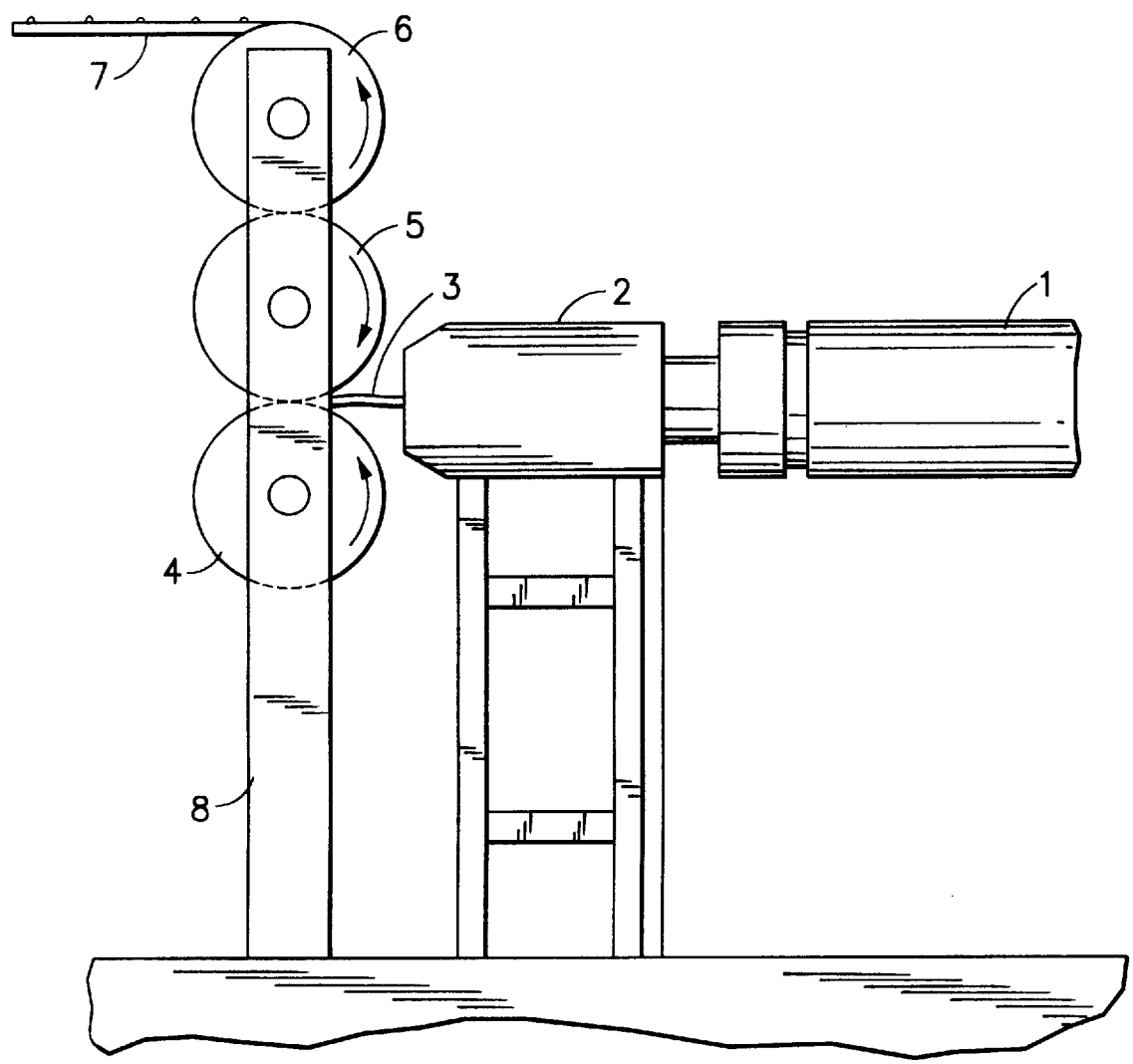
FIG. 1 is a plan view showing the process of forming the liner of the subject invention.

FIG. 1 shows diagrammatically the basic construction of a system for the continuous manufacturing of thermoplastic liners. The system consists of an extruder 1 arranged to feed thermoplastic through a slot die 2, to produce a smooth thermoplastic sheet 3. The plastic sheet 3 is fed into a nip defined by two rolls 4 and 5, and caused to serpentinely travel about portions of the roll 5 and a third roll 6. The three rolls 4, 5, 6 collectively make up a calender 8, which causes the smooth sheet 3 to be formed as a thermoplastic liner 7 having projections extending from one surface thereof.

Figure 2:
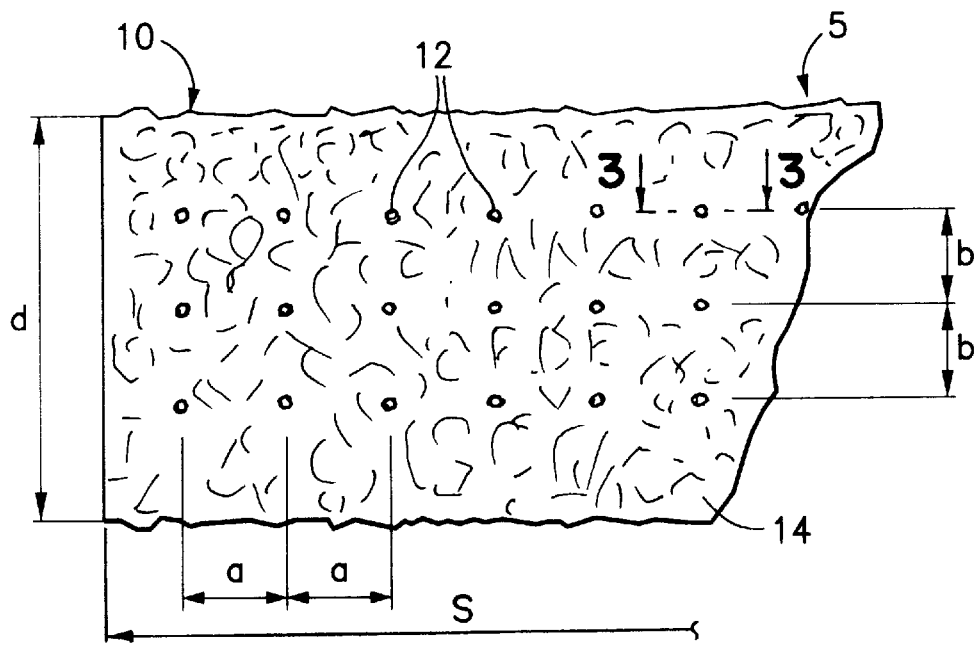
FIG. 2 is a partial side view of the calendering roll of the subject invention.

To produce the liner 7 in accordance with the invention of the subject invention, the middle roll 5 of the calender 8 is formed with a generally cylindrically shaped body 10 having a plurality of blind apertures 12 extending thereinto. The body 10 is also formed with a roughened outer surface 14 which extends along the full length "s" of the roll 5. To form the roll 5, the body 10 is provided with the outer surface 14 being initially substantially smooth. The blind apertures 12 are bored into the body 10, through the outer surface 14, at a plurality of locations. As shown in FIG. 2, the blind apertures 12 can be aligned to be evenly spaced axially at intervals "a" along the length "s" of the roll 5, and/or the blind apertures 12 can be located to be evenly spaced circumferentially about the circumference of the body 10 at equal intervals "b". Although not shown, the blind apertures 12 could be located at offset locations, whereby alternating blind apertures 12 are located axially and circumferentially. Additionally, the blind apertures 12 can be randomly located about the body 10 of the roll 5.

Figure 3:
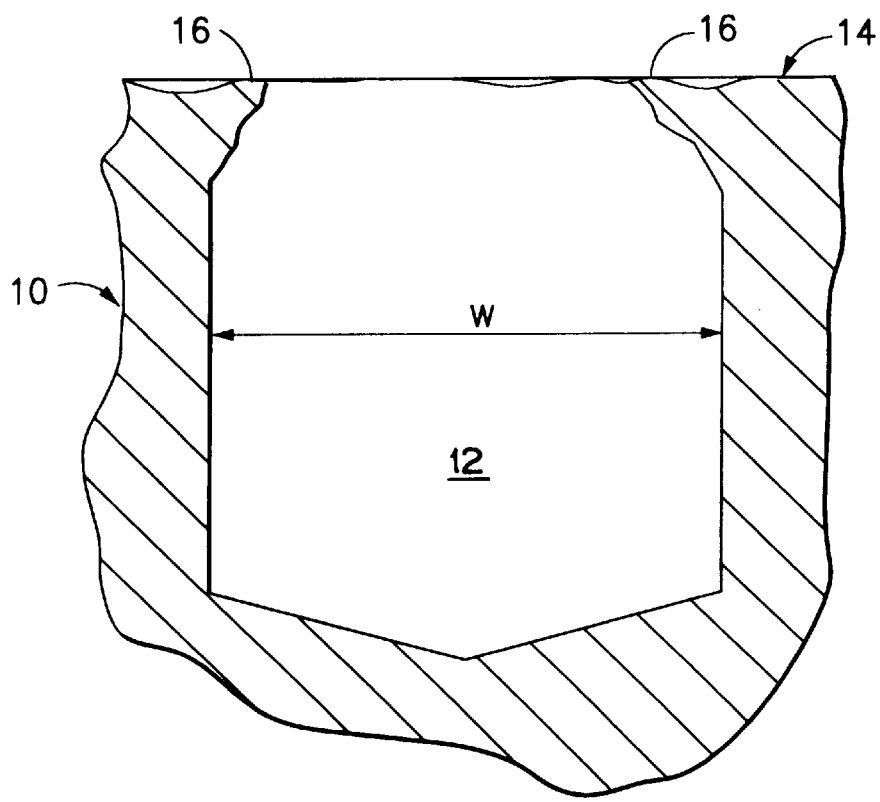
FIG. 3 is an enlarged cross-sectional view of a blind aperture taken along lines 3—3 in FIG. 2.

Referring to FIG. 3, each of the blind apertures 12 is bored into the body 10 to a predetermined depth. Also, each of the apertures 12 is initially bored into the body 10 to define a constant cross-section portion defining the diameter "w". Once the blind apertures 12 have been bored into the body 10, the outer surface 14 is caused to be roughened. FIG. 2 shows schematically the roughened texture of the outer surface 14. FIG. 2 is intended to depict an exemplary embodiment of the outer surface 14 and does not limit the scope of this application. Any patter of non-smooth configurations can be formed in the outer surface 14. Also, any procedure known to those skilled in the art can be used to roughen the outer surface 14, including techniques such as knurling. Preferably, the outer surface 14 is caused to be roughened in a random fashion. As the outer surface 14 is roughened, the openings of each of the blind apertures 12 are also caused to be deformed, as shown in FIG. 3. For example, as shown diagrammatically in FIG. 3, a burr 16 may be caused to inwardly extend into the opening of the blind aperture 12. It is to be understood that the process of roughening the outer surface 14 is intended to create irregular shaped openings in the blind apertures 12 which define dimensions different than the diameter "w". Thus, each of the blind apertures 12 should have an irregular shaped opening which extends coextensively with the outer surface 14 and a constant cross-section portion which extends therefrom into the body 10.

Figure 4:
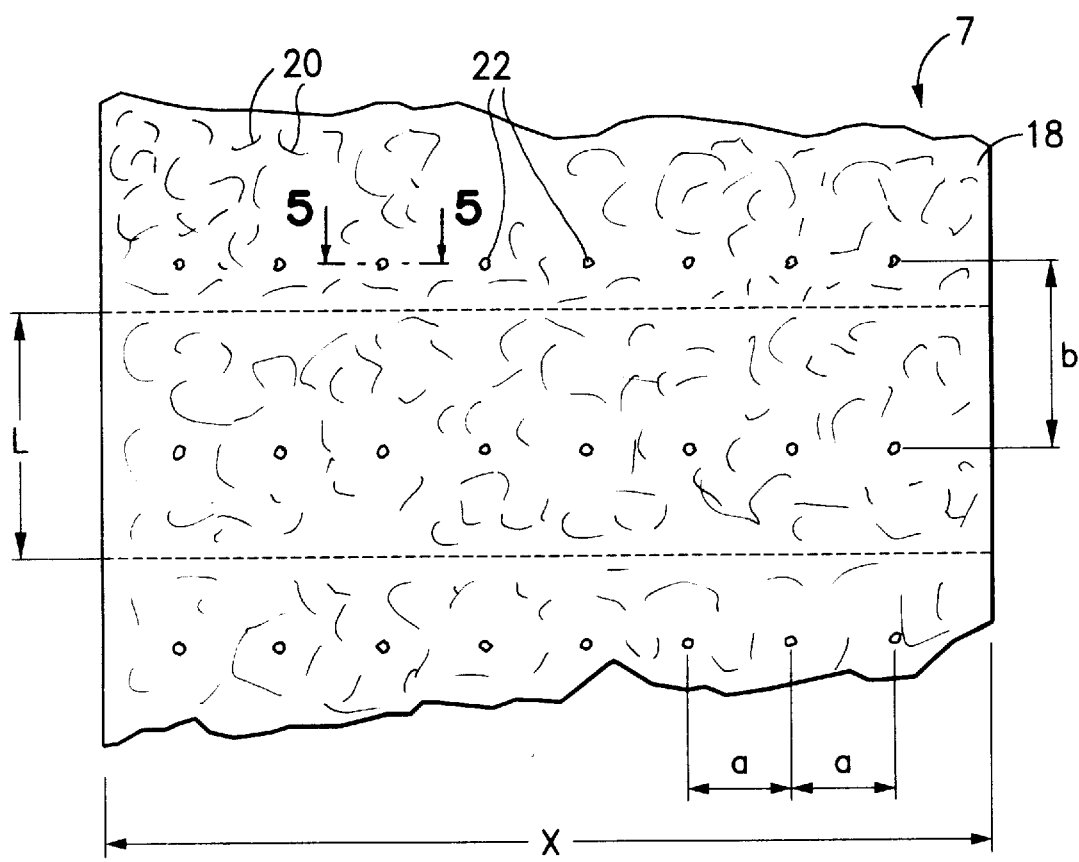
FIG. 4 is a plan view of a portion of the liner of the subject invention.

Referring to FIG. 4, the liner 7 is formed with a width "x" which can not be greater than the length "s" of the roll 5 used to form the liner 7, and the width "x" of the liner 7 is controlled by the slot die 2. The liner 7 is continuously formed, as described above, and can be cut to any length. The liner 7 is formed with two opposing surfaces which are coextensive with the width and length thereof. At least one surface 18 of the liner is formed with a roughened, non-smooth configuration. As depicted in FIG. 4, irregularities 20 are randomly disposed about the surface 18. The irregularities 20 are surface irregularities and may include embossed ridges, crevices, projections, craters, and the like. FIG. 4 is intended only to show by graphical depiction that the surface 18 is non-smooth, and the subject application is not limited to any roughened pattern disclosed therein. The roughened pattern formed on the surface 18 may take any form. Furthermore, although not shown, the opposing surface of the liner 7 may also be formed with a roughened configuration.

Figure 5:
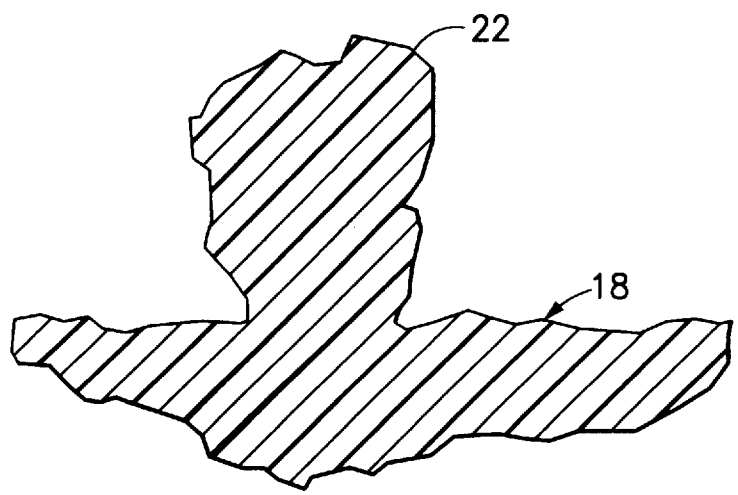
FIG. 5 is a cross-sectional view of a projection taken along lines 5—5 in FIG. 4.

A plurality of irregularly shaped projections 22 extend from the roughened surface 18 of the liner 7. As shown in FIG. 4, the projections 22 may be disposed at equal intervals to define columns separated by the interval "a" and rows separated by the interval "b". The spacing of the projections 22, both laterally and longitudinally, corresponds to the spacing of the blind apertures 12 formed in the roll 5. The lateral spacing of the projections 22, across the width of the liner 7, is dictated by the axial spacing of the apertures 12 in the roll 5, whereas the longitudinal spacing of the projections 22 along the length of the liner 7 is determined by the circumferential spacing of the apertures 12 in the roll 5. As described above, the apertures 12 may be offset circumferentially and axially in the roll, resulting in the projections 22 being offset along the length and the width, respectively, of the liner 7. Also, as described above, the projections 12 can be randomly formed in the roll 5, with a corresponding random pattern of the projections 22 being formed on the liner 7. Each of the projections 22 is formed with an irregular shape, as shown in FIG. 5. The projections 22 may each be formed with a different irregular shape. Again, FIG. 5 is intended only to show an irregular shape, and the projections 22 may be formed with various irregular forms which extend from the roughened surface 18.

The roughened surface 18 includes an irregular non-smooth pattern which is impressed thereon by the roll 5. Since the liner 7 is formed continuously, the irregular pattern formed on the roll 5 will be impressed on the liner 7 at fixed intervals. Referring to FIG. 4, the dimension "L" is intended to designate a length of the liner 7 which is equal to in length to the circumference of the roll 5. As shown in FIG. 2, the roll 5 has a diameter "d". Thus, the dimension "L", shown in FIG. 4, would be equal to the product of $\pi$ times the diameter "d" of the roll 5, or stated algebraically, L=$\pi$d. Consequently, as the liner 7 is formed continuously, although not shown, the irregular pattern formed on the surface 14 of the roll 5 is repeated at equal intervals of "L" along the length of the liner 7.

Figure 6:
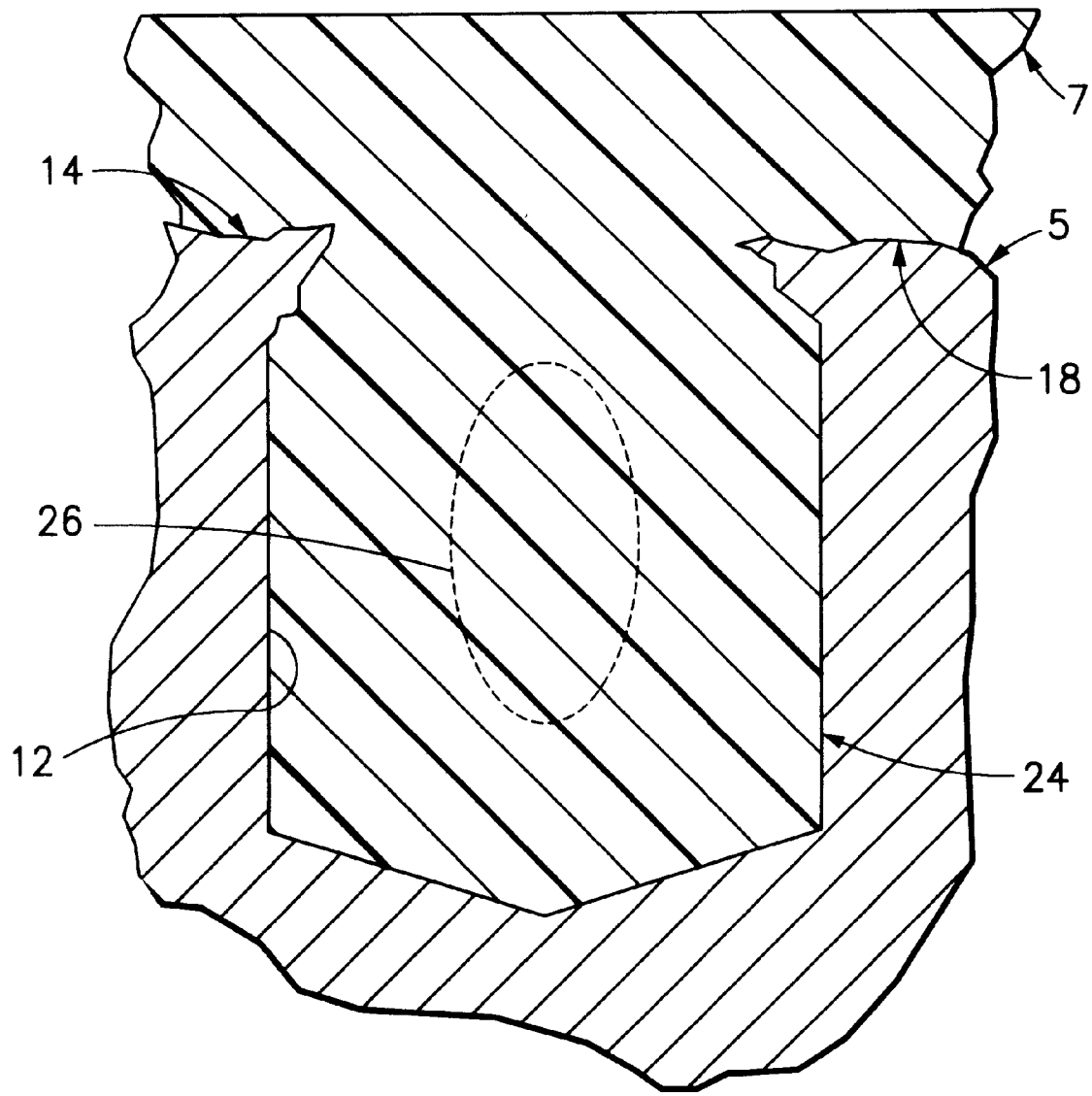
FIG. 6 is a cross-sectional view of a blind aperture, similar to FIG. 3, with thermoplastic material disposed therein.

During the calendering of the liner 7, the roughened pattern formed on the outer surface 14 of the roll 5 is impressed onto the liner 7. Simultaneously, thermoplastic material from the liner 7 is urged into the blind apertures 12. The roll 5 may be chilled or heated during the calendering process, but neither is required. Preferably, the temperature of the roll 5 is maintained, such that the thermoplastic material disposed in the blind apertures 12 during the calendering process is partially cooled. It is desired that the thermoplastic material cool sufficiently to allow the outer surface 24 of the material in contact with the respective aperture 12 to be cooled to a limited depth in each of the apertures 12. Referring to FIG. 6, it is preferred that the thermoplastic material, disposed in the blind aperture 12, have a core 26, which is in a molten state, and that the core 26 remain in a molten state as the liner 7 is removed from the roll 5. As the thermoplastic material is removed from the blind aperture 12, the irregular shaped opening of the blind aperture 12 will preferably restrict the removal of the thermoplastic material therefrom. As the material is removed, the irregular shaped opening will cut and damage the hardened outer surface 24 of the material and simultaneously cause the molten core 26, and consequently the entire projection 22, to be elongated. If the thermoplastic material is either chilled too much or insufficiently chilled, the thermoplastic material will accordingly either fully harden within the blind aperture 12 or insufficiently harden, resulting in either little or no elongation, and/or no damage to the other surface 24. Adjustment of the temperature of the roll 5 can be made to achieve desired elongation and/or extent of damage of the projections 22. The combination of the irregularly shaped projections 22 and the roughened surface 18 of the liner 7 are desired to generate good gripping ability for the liner 7.

While the invention has been described with respect to preferred embodiments, it is apparent that a variety of changes may be made without departing from the scope of the invention as defined by the appended claims.

I claim:

1. A thermoplastic liner comprising a thermoplastic base layer having spaced, opposing outer surfaces, wherein at least one said surface is irregular and non-smooth, and wherein a plurality of irregularly shaped projections extend unitarily from said irregular and non-smooth surface and are evenly spaced laterally and evenly spaced longitudinally, said projections being unitarily formed with said base layer from a single material.

2. A thermoplastic liner as in claim 1, wherein said non-smooth surface defines an irregular pattern over a rectangular portion of said liner, and wherein said pattern is repeated along the longitudinal length of said liner.

* * * * *